United States Patent

McQueen et al.

[11] 4,340,784
[45] Jul. 20, 1982

[54] PORTABLE TELEPHONE ANSWERING DEVICE

[75] Inventors: Wayne F. McQueen, Tullahoma, Tenn.; Raymond R. Schansman, Huntsville, Ala.; William A. Hurd, Huntsville, Ala.; Joerg Fischer, Huntsville, Ala.; Billy W. Dunn, Arab, Ala.

[73] Assignee: International Port-A-Call, Tullahoma, Tenn.

[21] Appl. No.: 119,007

[22] Filed: Feb. 5, 1980

[51] Int. Cl.³ .................................. H04M 1/64
[52] U.S. Cl. .................. 179/6.12; 179/6.01; 369/50
[58] Field of Search ......... 179/6 AC, 6 R, 100.1 VC, 179/6.12, 6.01; 360/78, 74.7, 74.2, 106; 369/50

[56] References Cited

U.S. PATENT DOCUMENTS

| | | | |
|---|---|---|---|
| 2,165,546 | 7/1939 | Heller | 179/6.12 |
| 2,937,237 | 5/1960 | Zanardo | 179/6 AC |
| 3,153,831 | 6/1964 | Youtie | 179/6.01 |
| 3,299,209 | 1/1967 | Roger | 179/1 HS |
| 3,319,003 | 5/1967 | Prager | 179/6.12 |
| 3,376,390 | 4/1968 | Hashimoto | 179/6.01 |
| 3,466,396 | 9/1969 | Guimond | 179/6.01 |
| 3,471,643 | 10/1969 | Owen | 179/6.12 |
| 3,480,720 | 11/1969 | Aiba | 179/1 HS |
| 3,492,427 | 1/1970 | Foster | 179/6 AC |
| 3,499,993 | 3/1970 | Owen | 360/71 |
| 3,527,893 | 9/1970 | Honobe | 179/6.01 |
| 3,562,430 | 2/1971 | Faust | 179/6.12 |
| 3,586,779 | 6/1971 | Chernack | 179/6 R |
| 3,590,159 | 6/1971 | Wolf | 179/6 R |
| 3,657,479 | 4/1972 | Sweenie | 179/1 C |
| 3,715,504 | 2/1973 | Piott | 179/6.12 |
| 3,716,673 | 2/1973 | Meri | 179/1 C |
| 3,735,054 | 5/1973 | Poshimura | 179/100.1 VC |
| 3,823,414 | 7/1974 | Hodgson | 360/64 |
| 3,838,219 | 9/1974 | Mason | 179/2 DP |
| 3,838,220 | 9/1974 | Gormly | 179/2 A |
| 3,865,987 | 2/1975 | Yomamoto | 179/6 R |
| 3,876,837 | 4/1975 | Gormley | 179/2 C |
| 3,904,825 | 9/1975 | Henry | 179/6.12 |
| 3,909,538 | 9/1975 | Jacobson | 179/6 R |
| 3,967,068 | 6/1976 | Shinohara | 360/106 |
| 4,178,477 | 12/1979 | Sato | 360/105 |
| 4,198,544 | 4/1980 | Buglewig | 360/78 |

FOREIGN PATENT DOCUMENTS 1481206  4/1967  France .................. 179/6.12

Primary Examiner—Vincent P. Canney
Assistant Examiner—Alan Faber
Attorney, Agent, or Firm—Cushman, Darby & Cushman

[57] ABSTRACT

A portable telephone answering device which fits over the cradle of a telephone handset and receives the handset with a speaker adjacent the handset microphone and a microphone adjacent the handset speaker. An outgoing message can be recorded on one track of a multichannel loop of tape. When ringing is detected, the telephone plungers are released and the outgoing message played. Next the unit records an incoming message on another track. A metallic splice on the loop serves as a reference. The number of channels on which an incoming message has been recorded are counted and the count incremented only if audio signals are detected indicating a message was left.

9 Claims, 9 Drawing Figures

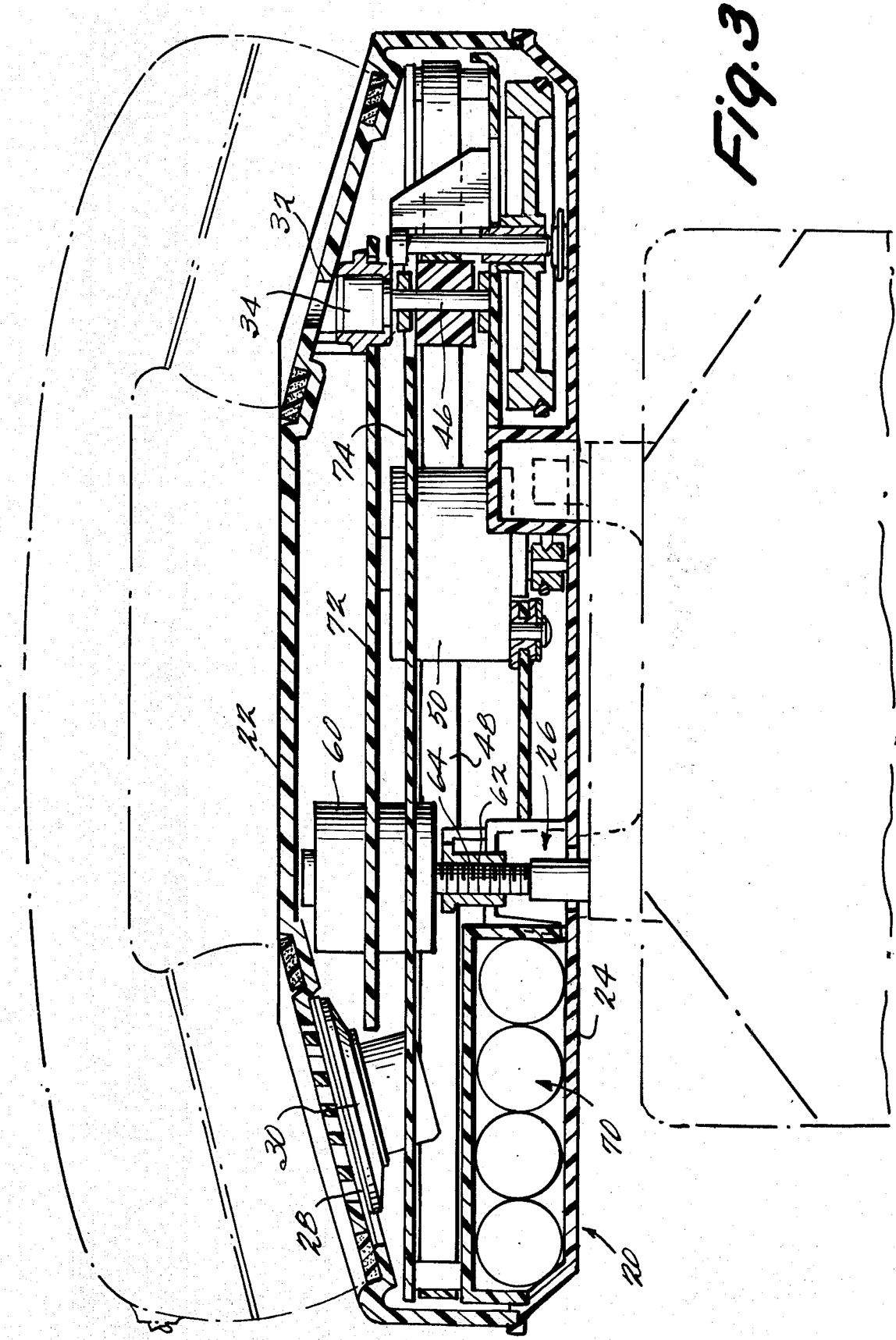

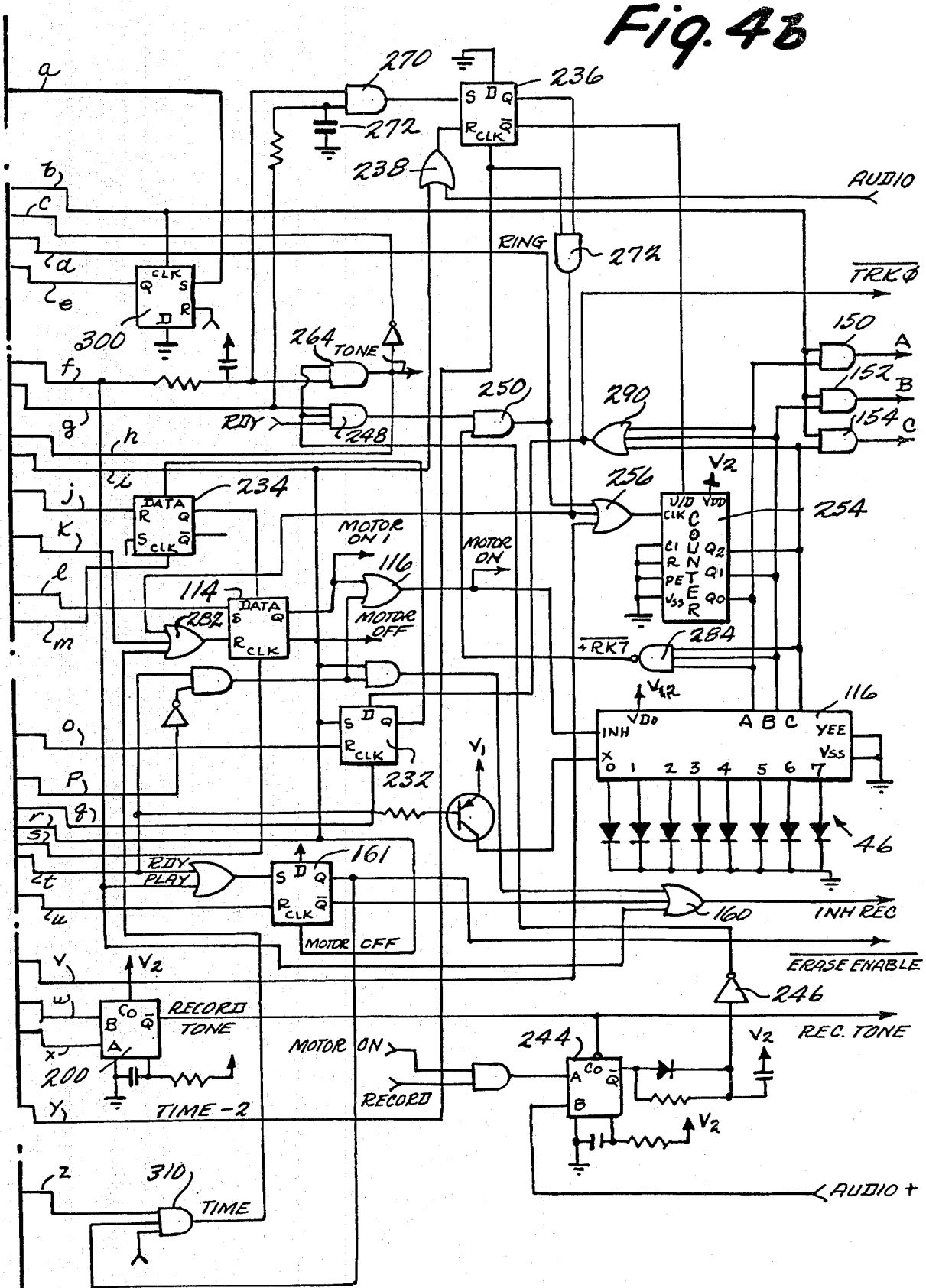

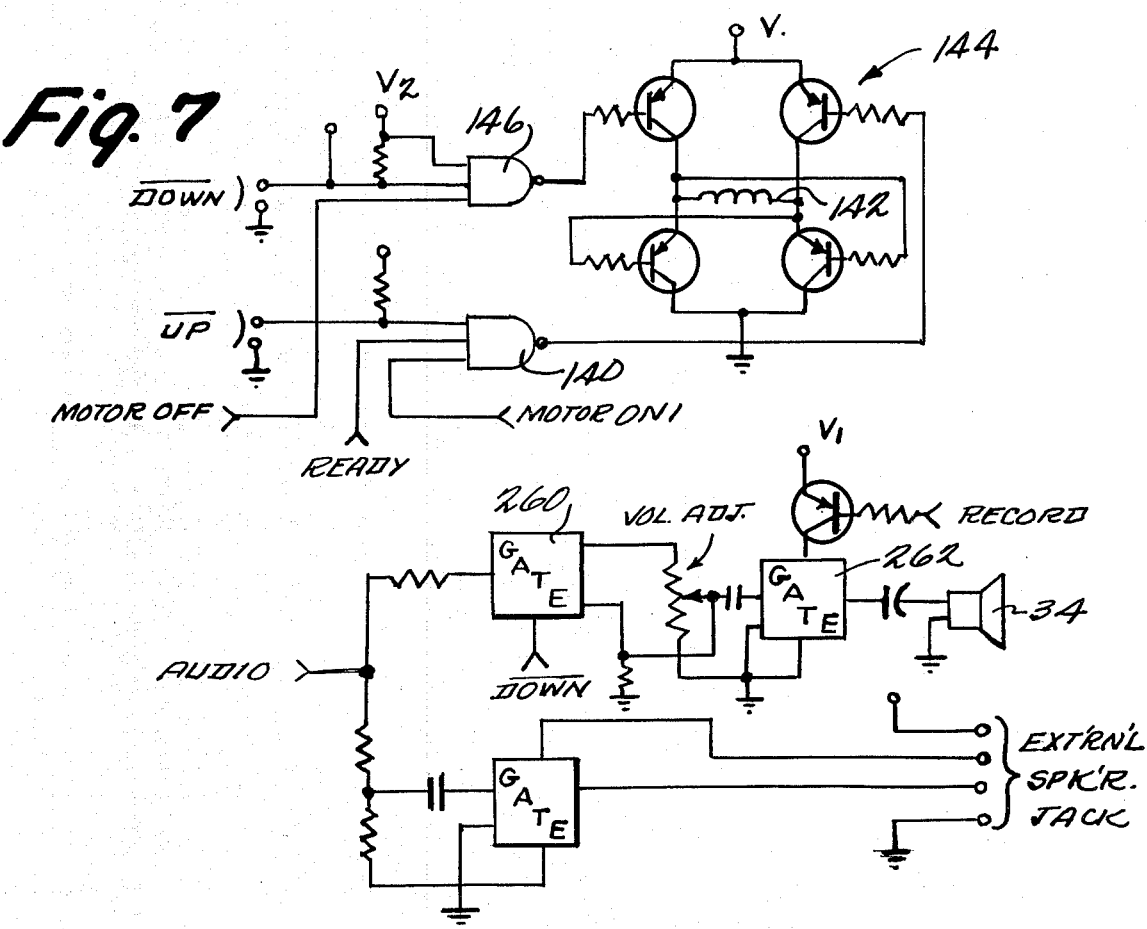
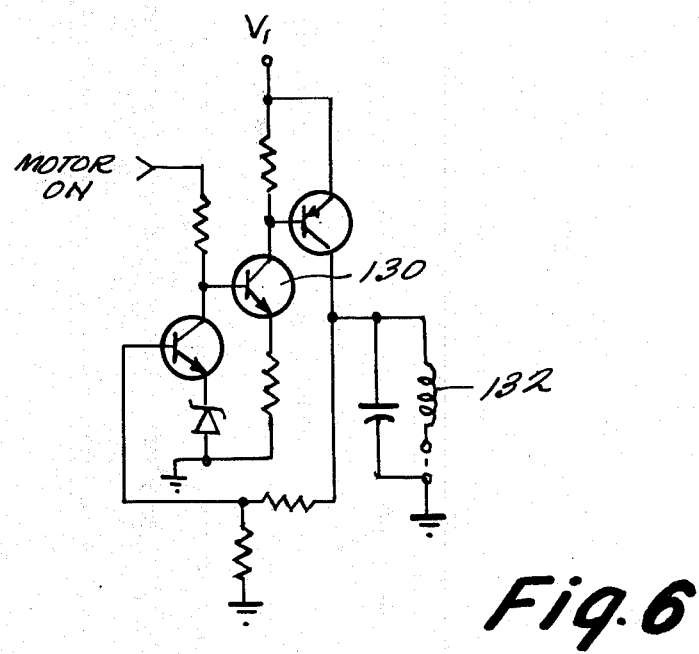

PORTABLE TELEPHONE ANSWERING DEVICE

BACKGROUND AND SUMMARY OF THE INVENTION

The invention relates to a portable telephone answering device.

In the modern world much of the flow of personal and business information occurs by way of the telephone. From the beginning of its use, one disadvantage of the telephone as a medium of communication has been the inability by the caller to leave a message if the unit which he has telephoned is unattended and the inability by the person at that unit to choose between answering the unit and continuing with some other work without losing all information relating to the call.

One obvious solution to these disadvantages has been telephone recorders, and many types of telephone recording devices are in widespread use. Typically, telephone recorders are designed to connect directly to the telephone line. Directly connected in this fashion they can directly affect the operation of the telephone system; and, thus, recorders of this type must meet specified standards and normally must be installed only by authorized personnel. Other types of telephone recorders have been designed to interact only with the headset of the telephone unit, and not to directly connect to the lines. Such units do not directly affect the telephone system and traditionally have not been subject to close supervision or installation. Such units typically, however, have been designed to be put into use at one location and cannot be readily carried from one telephone unit to another. The latter is a substantial disadvantage since most individuals in their personal and business life move each day between locations serviced by different telephone units which are themselves not portable. However, these portable devices have been overly complex; and, thus, have been priced necessarily too high to be attractive to many people who could effectively use such devices.

The present invention relates to a unique, relatively simple and advantageous portable telephone answering device which is designed to receive the headset of a telephone unit and to be readily portable from one location to another. The telephone device includes a housing which is adapted to fit over the cradle of a conventional desk telephone and to receive at the same time a conventional telephone headset having a speaker and a microphone. Plungers are mounted for movement with respect to the housing and for engaging the telephone plungers to release and depress the same to "answer" and "hang up" the telephone. An endless loop of a multi-channel recording tape is mounted within the housing to be driven past a multi-channel recording head. Logic circuitry controls the movement of the various elements for causing a message to be recorded on one channel of the loop and to be played following detection of ringing and "answering" of the phone. A tone is also recorded on the loop which preferably includes a metallic splice which can be sensed to indicate that the loop has made one complete revolution.

The splice operates as a reference point to begin recording of a message onto one channel of the multi-channel loop. At the end of the recording or just before the end of the loop, whichever comes first, a tone is placed upon the recording. When thereafter the device is placed in service on the cradle of a telephone unit with the headset thereof in place adjacent a microphone and speaker of the device, it responds to ringing of the unit by operating a motor which causes the plungers to rise so that the unit is "answered". Next, the motor which drives the tape is turned on and the head activated in a play mode to drive the speaker of the device and cause the previously recorded message to be played to the person who has dialed the unit. Typically, the message invites that person to leave a message following the tone.

When the tone has been played, the control logic responds to detecting the tone by shifting the heads so that they then record any audio sounds which are received by the unit subsequent to the tone. Rotation of the loop is also detected, for example by a cam rotation sensor, which produces pulses which can be counted to determine when a complete revolution from the point of initial recording has occurred. When the count indicates that a complete revolution from the location where the tone signal was recorded has taken place, recording is stopped while the motor continues to run until the reference splice is detected, whereupon the tape-drive motor is turned off. A counter is incremented to indicate the number of messages which have been recorded, and the output of that counter utilized to control the channel on which the next message is recorded. In the event that no message is detected following the tone, the counter is not incremented and the channel is used during the next message recording.

The answering device of the present invention can also be used in a playback mode to play back the messages which have been recorded and in an erase mode to erase messages and prepare for recording of new messages.

Other objects and purposes of the invention will become clear from the following detailed description of the drawings.

BRIEF DESCRIPTION OF THE DRAWINGS

FIG. 3 shows a sectional view through the lines 3—3 of FIG. 2;

FIGS. 4a and 4b show a schematic of part of the control logic circuitry of the present invention;

FIG. 6 shows a schematic of the circuitry for operating the drive motor for the tape;

FIG. 7 shows a schematic of the circuitry for operating the motor for lifting and depressing the plungers; and FIG. 8 shows a schematic of the circuitry for indicating the phone has been answered.

DETAILED DESCRIPTION OF THE DRAWINGS

Figure 1:
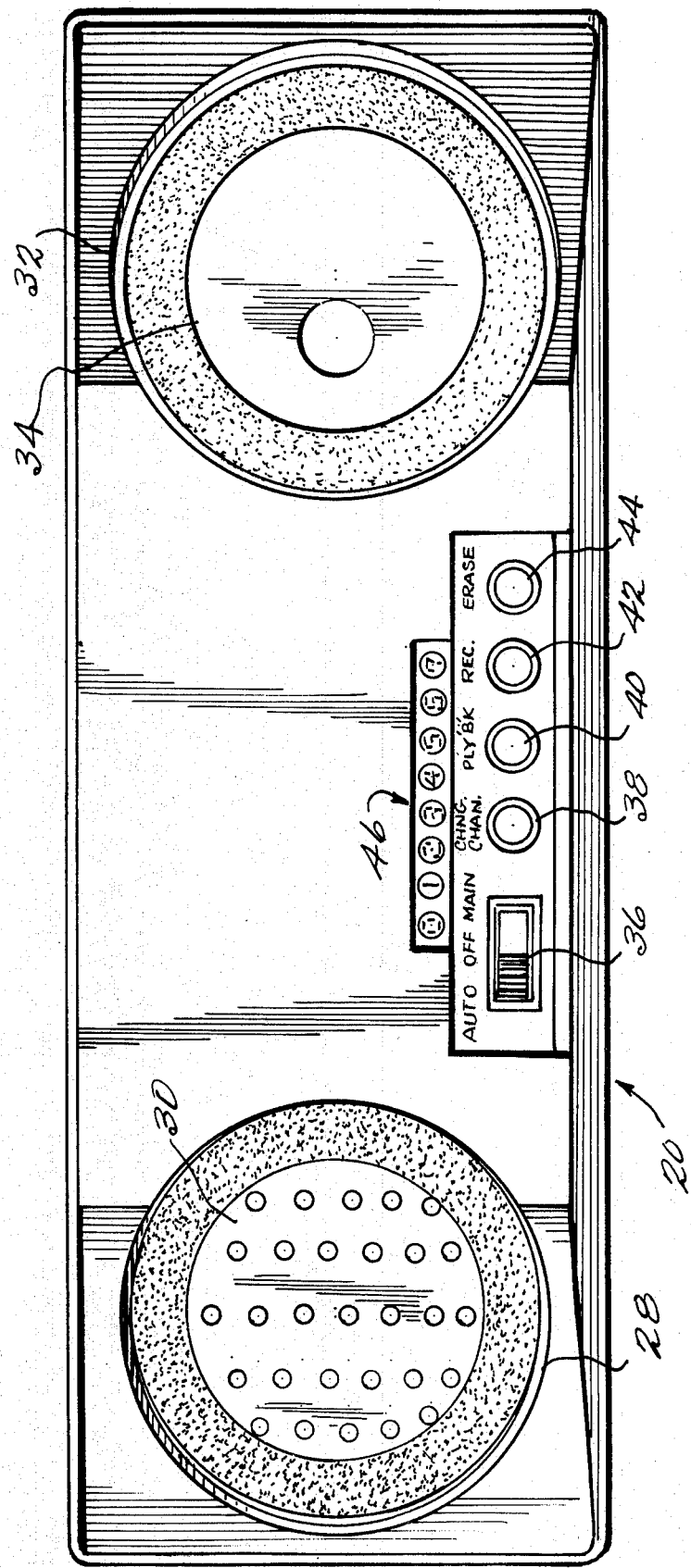
FIG. 1 shows the top view of the invention of the present application.
Figure 2:
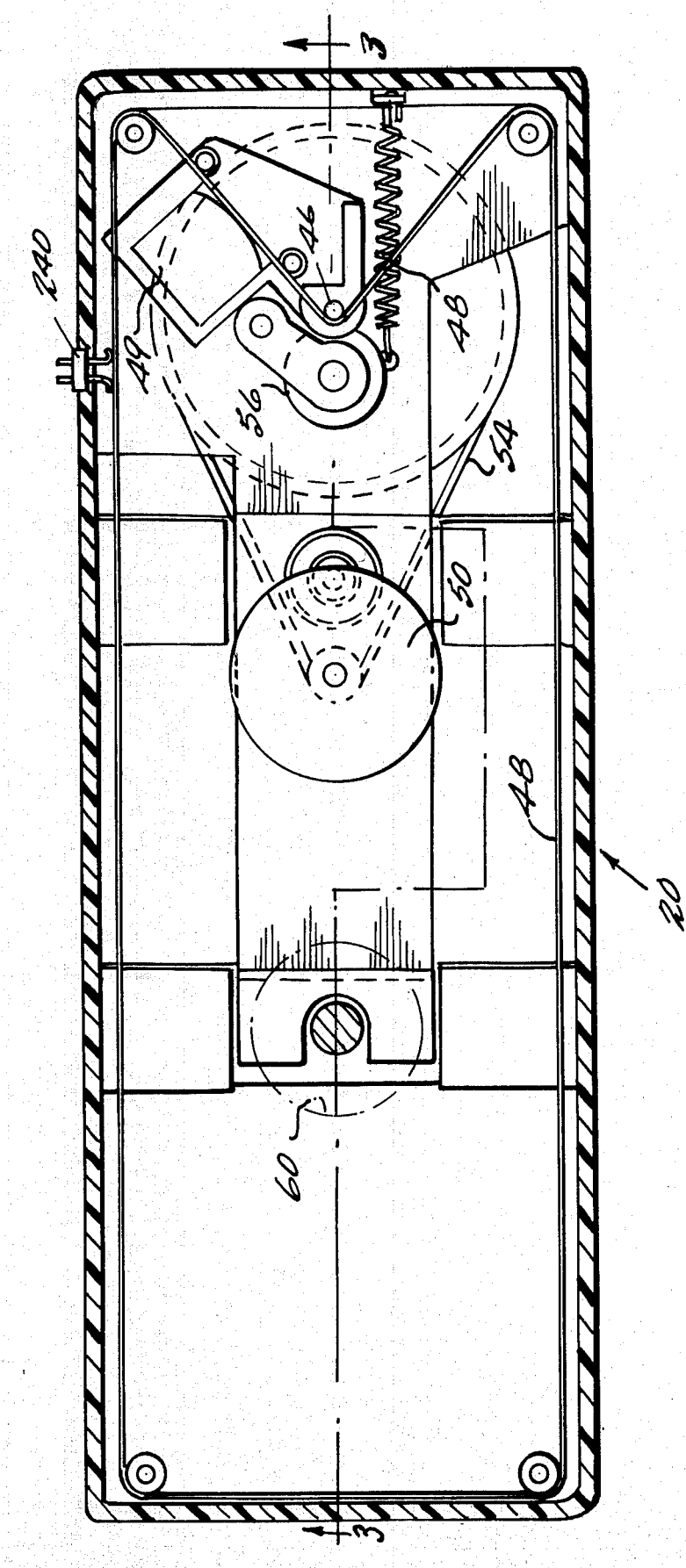
FIG. 2 shows a top sectional view of the present invention.

Reference is now made to FIGS. 1 through 3 which illustrate the mechanical components of the answering device of the present invention. The unit is designed to be attractive, lightweight, portable, and to be easily carried from one location to another. Housing 20 is formed of an upper part 22 of suitable material, such as molded or extruded plastic, and a similar lower portion 24 which are fixed together by any suitable means. Lower portion 24 is intended to sit upon the cradle of a conventional desk telephone set as shown in dashed lines in FIG. 3 with the plungers thereof extending upward into a recess 26 as can also be seen best in FIG. 3. The upper part 22 is designed to receive the headset of the same telephone unit with the microphone thereof being received in a recessed portion 28, adjacent a conventional speaker 30 and the speaker of the headset being received in a recessed portion 32, adjacent a conventional microphone 34 in the answering device.

A plurality of controls including an on/off and operate switch 36 and buttons 38, 40, 42, and 44 are provided for respectively controlling the changing of channels, playback, recording and erasing. A bank of LEDS 46 are mounted adjacent the controls for indicating during recording and playback which of the channels is being played or onto which channel recording is being made.

Two motors are provided within the housing 20 for respectively causing depression and lifting of the telephone plungers with recess 26 for driving the capstan 46 which rotates the endless loop 48. Motor 50 drives capstan 46 via belt 54 and pressure roller 56 for rotating loop 48 past conventional multi-channel head 49 and motor 60 rotates a threaded member 62 on which nut 64 moves to move the plungers of the telephone unit up and down. Power for the portable unit is supplied by batteries 70 within housing 20.

Figure 4A:
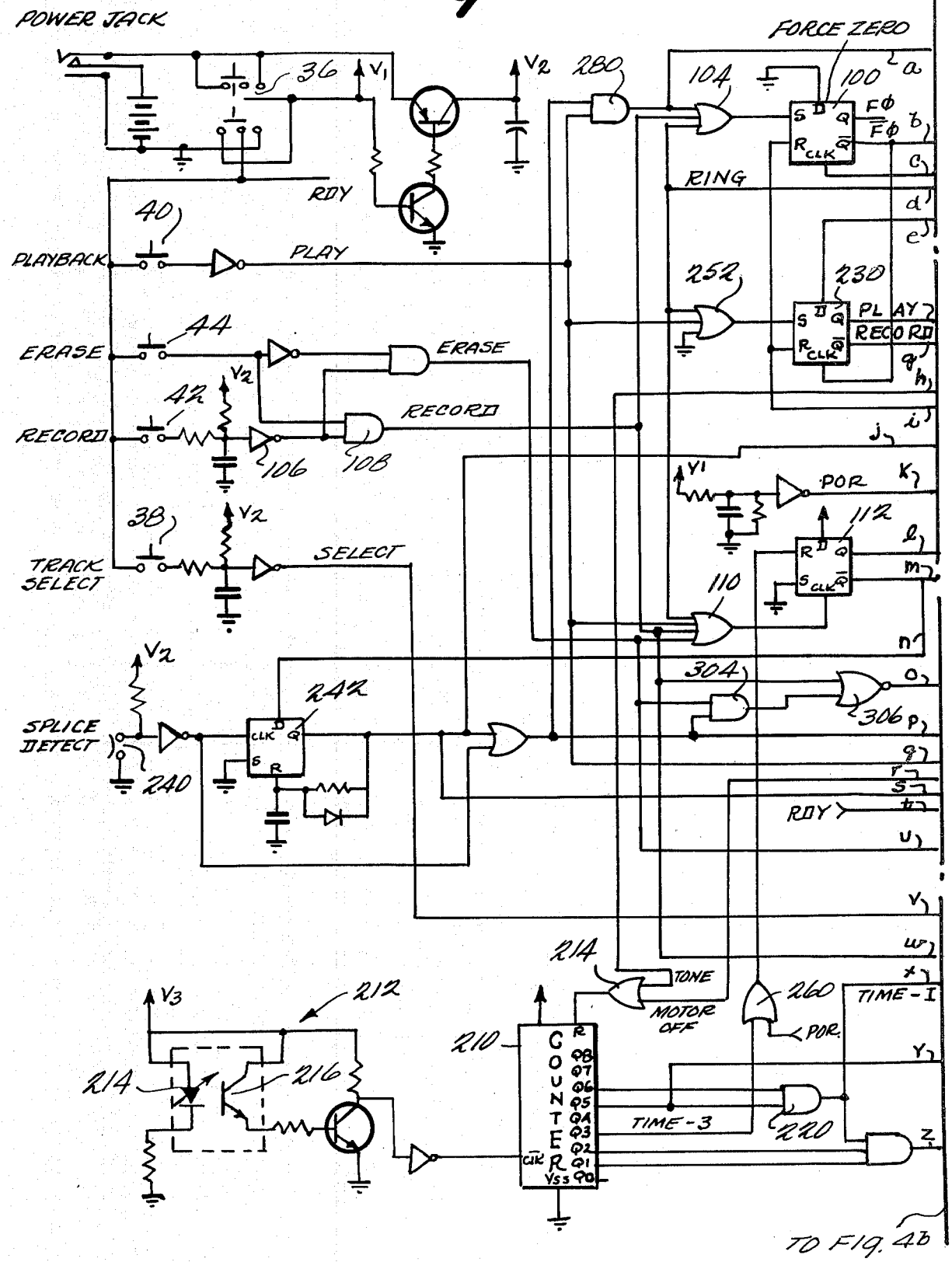

Reference is now made to FIGS. 4a and 4b which illustrate the control logic for controlling the mechanical elements shown in FIGS. 1 through 3 to carry out the functions of the device of the present invention as generally described above.

One of the advantages of the present invention is that it utilizes only a single loop of multi-track tape for recording messages. This permits the structure for driving the tape and reading the messages to be simple and to be placed within a very limited space. A splice of metal tape, or the like, is preferably provided on this endless loop for a reference so that the normal playback and recording sequence can start from a common loop location.

One of the tracks on the tape, termed the zero track for purposes of explanation, is reserved for recording an outgoing message which is played by the device to anyone who telephones to the unit. To record a message on the zero track, the record button 42 is depressed and held causing the force zero flip-flop 100 to be set via OR gate 104. Closing recording switch 42 grounds the input to inverter 106 causing AND gate 108 to shift its output high since its other input is also high. (AND gate 108 prevents the system from trying to record while erase switch 42 is closed).

Closing switch 42 also applies a high input to OR gate 110 which in turn clocks flip-flop 112 so that its output Q goes high, setting flip-flop 114. The Q output of flip-flop 114 is applied to OR gate 116 which now produces the MOTOR ON signal. The MOTOR ON signal inhibits analog gate 116 which activates the LED 46 associated with the track being recorded or played.

The setting of flip-flop 100 forces multi-channel head 49 to record or play only on the zero track as will be explained below.

The MOTOR ON signal is applied to the gate of transistor 130 in FIG. 6 so that current flows through the winding 132 of tape drive motor 49 which then begins advancing the loop of the endless tape to effect recording.

Figure 5:
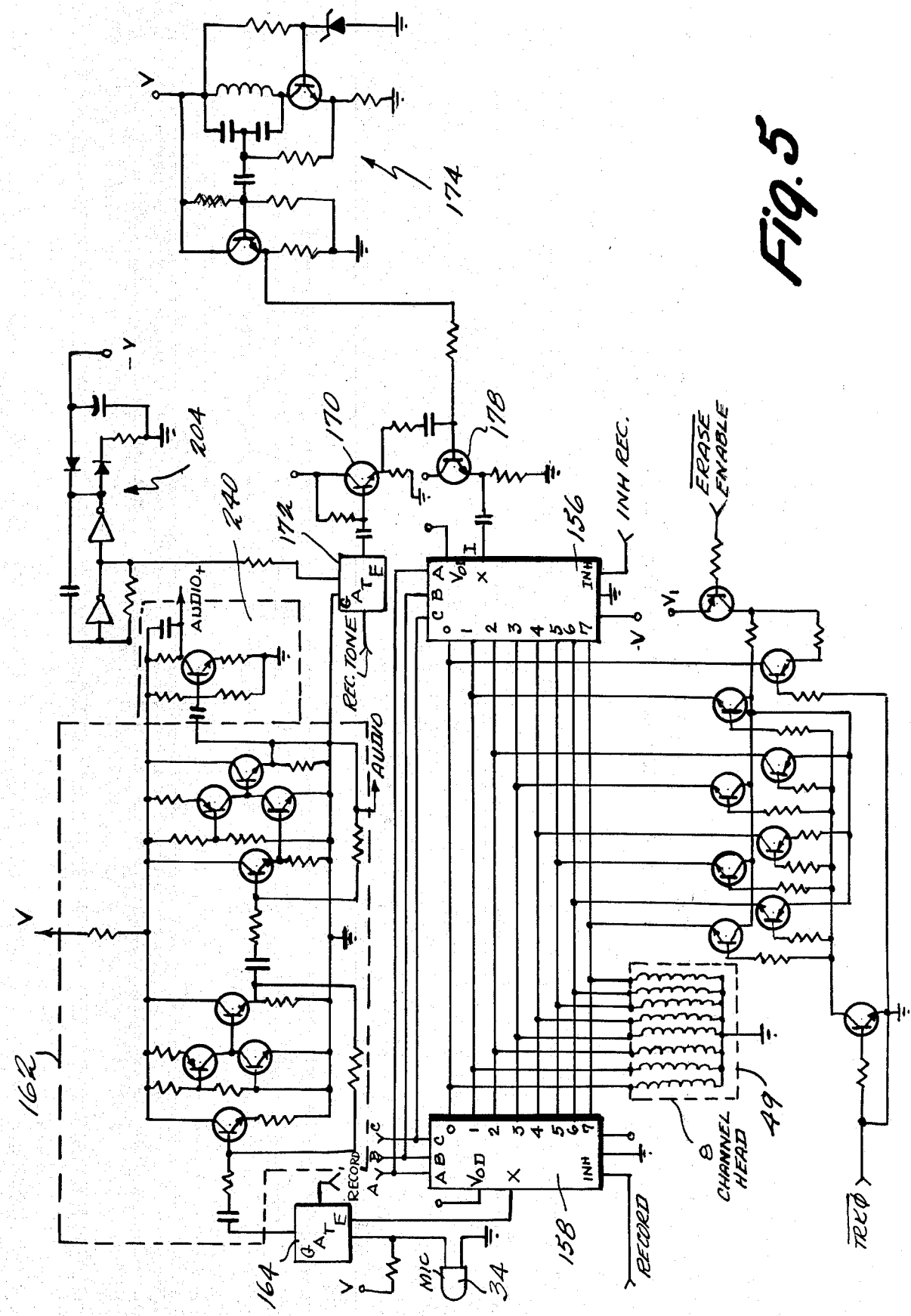
FIG. 5 shows a detailed schematic of the logic circuitry for controlling the recording heads.

The $\overline{FC\phi}$ output of the FORCE ZERO flip-flop 100 is applied to AND gates 150, 152, and 154 in FIG. 4b to force the analog gates 156 and 158 in FIG. 5 to select only the zero track for recording or playing. The associated head of the bank of heads then records or plays the message onto the zero track. The RECORD signal is applied to the inhibit input to gate 158. OR gate 160 in FIG. 4b produces the INH REC signal during erasing when flip-flop 161 is reset, when the system is in the play mode and when the tape motor is turned off. The INH REC signal is applied to the inhibit input to gate 156 in FIG. 5.

The message which is spoken is detected by microphone 34 and applied to audio amplifier 162 in FIG. 5 via conventional analog gate 164. The audio signal from amplifier 162 is then applied to transistor 170 via a second analog gate 172. A 40 Kc bias oscillator 174 provides the A.C. bias for recording, and the output thereof is applied to transistor 178 together with the output of transistor 170. The combined signal is then applied to analog gate 156 which causes the recording head associated with the zero track to record the information upon that track. When the message has been completed, provided it is completed before the end of the loop, record button 42 is released causing the one-shot flip-flop 200 in FIG. 4a to produce the REC TONE signal which in turn causes analog gate 172 in FIG. 5 to shift into connection with oscillator 204 which produces a 1200 Hz sound on the zero track which is mixed with the output of oscillator 174 as described above.

In the described embodiment, the system always begins recording in the zero channel at a metal splice which serves as a reference. However, recording of incoming messages occurs after the recorded tone, and, thus, it is necessary to establish a reference which changes for each recorded message which is played for incoming calls. This feature allows for different length outgoing messages without leaving blank spaces on the tape. In addition, a tone must be placed on the tape during direct recording before the loop has been completed. For these purposes a counter 210 is connected to a cam rotation sensor 212. Sensor 212 preferably includes a strip which rotates with the tape and has a plurality of slots intermittently transmitting light from a source 214 to an optical detector 216 to produce a string of pulses, at a frequency related to tape speed, to the clock input to counter 210. Counter 210 is reset initially by the MOTOR OFF signal via gate 214. The TONE signal also resets counter 210 to zero via OR gate 214. Thus, the count in counter 210 during recording indicates the length of tape on which the recording has taken place. Three outputs of counter 210 are decoded to produce the TIME signal indicating a complete revolution has taken place since the counter was reset, the TIME-1 signal indicating that a complete revolution, except for a small remaining time, has taken place, and the TIME-2 signal. The TIME signal is used when recording or playing an incoming track to indicate a full revolution of tape.

During direct recording it is necessary that the message recorded be terminated and the tone be generated before a complete revolution, i.e., before the splice is detected. For that purpose, the TIME-1 output of counter 210 via AND gate 220 is applied to one-shot flip-flop 200 to produce the REC TONE signal at the TIME-1 time if the record button has not been released by that time, which release also causes flip-flop 200 to produce the REC TONE signal.

After the TONE signal is produced, the motor continues to advance the tape until the splice is detected by a conventional sensor 240 to cause an input to flip-flop 114. The data input to flip-flop 114 goes low and flip-flop 114 is then clocked low by flip-flop 242 so that the MOTOR OFF signal is produced. The current through the winding 132 is now ended and the tape motor stops operation. The MOTOR OFF signal is also applied to the reset inputs to flip-flops 100 and 230 which are thus reset. The device is now ready to respond to an incoming call.

After a message has been directly recorded on tape, the system can now be placed in the auto/ready mode for recording incoming messages. This is accomplished by the three-position slide switch 36, producing the RDY signal. The RDY signal assures that flip-flops 100 and 230 have been reset. Resetting flip-flop 100 insures recording on other than the zero track and resetting flip-flop 230 forces the system into the record mode. Flip-flop 232, which determines whether the system will stop after one or two splice senses, is also set by the MOTOR OFF signal to apply a high signal to the data input to flip-flop 234. The MOTOR OFF signal also insures that counter 210 is reset via OR gate 214 and flip-flop 236 is also held reset by the MOTOR OFF signal via OR gate 238. Flip-flop 162 is set by the MOTOR OFF signal, as described above.

If the telephone now rings with sufficient amplitude to cause level detecting circuit 240 in FIG. 5 to produce the AUDIO+signal, one-shot flip-flop 244 in FIG. 4b produces a low signal which is inverted by inverter 246 and applied as one input to AND gate 248. AND gate 248 in turn has its output applied to one input to AND gate 250. When the device is in the ready/auto mode and the RDY signal is being produced and also the device is in the record mode, AND gate 248 applies a high input to AND gate 250. If the $\overline{\text{TRK 7}}$ signal is also high, indicating one or more tracks are available for recording, the RING signal is then produced at the output of AND gate 250 and applied via OR gate 252 to set flip-flop 230 into the play mode of operation.

Flip-flop 236 was previously reset by the MOTOR OFF signal causing a high signal to the up/down input of counter 254 which controls the track on which recording will take place after the recorded message has been played. Counter 254 is incremented by the clock input applied via OR gate 256 from AND gate 250. Flip-flop 112 is also clocked high by the RING signal via OR gate 110, in turn causing flip-flop 114 to be set and the MOTOR ON signal to be produced. The MOTOR ON signal is applied to NAND gate 140 in FIG. 7 together with the RDY signal and an $\overline{\text{UP}}$ signal indicating that the unit plungers are depressed. Any suitable sensors can be used to produce the $\overline{\text{UP}}$ and $\overline{\text{DOWN}}$ signals. Current now flows through winding 142 of the plunger motor as two of the associated set of transistors generally indicated as 144 become conductive when the plungers reach their maximum position, the $\overline{\text{UP}}$ signal changes causing the current to cease flowing through the winding and the plunger motor to stop operating. The unit has now been "answered" and the previous recorded message on the zero track can now be played.

The AUDIO signal is applied to gate 260 in FIG. 8 which normally passes the signal through the VOLADJ POT. When the $\overline{\text{DOWN}}$ signal indicates the phone has been answered, gate 260 passes the signal directly to amplifier 262. Amplifier 262 drives the speaker 34 when the system is not recording.

At time minus 3, flip-flop 112 is reset via OR gate 260 which clocks flip-flop 234 setting the system to detect two splices before the motor is stopped.

At the end of the recorded message, the tone is again detected to cause flip-flop 244 in FIG. 4b to produce another pulse. This pulse is applied to one input to AND gate 264. Since flip-flop 230 is now set, the TONE signal is produced and applied to counter 210 to reset that counter. The TONE signal is also applied to the clock input to the FORCE ZERO flip-flop 100 so that the $\overline{\text{Q}}$ output becomes high, clocking flip-flop 210 into the record mode and also releasing the inhibit on gates 150, 152, and 154 so that the count in counter 254 now controls the channel on which a message is recorded. Flip-flop 236 is now set via AND gate 270, the input from the play line being held high for a short period by capacitor 272.

A message can now be recorded by the incoming caller. If audio information is received, the audio signal is produced and flip-flop 236 is reset via gate 238, when the audio signal is produced. However, if flip-flop 236 has not been reset by the time that counter 210 produces the TIME-2 signal, AND gate 272 applies a high input to OR gate 256 to clock counter 254. Since flip-flop 236 is still set, the counter 254 is decremented leaving the track on which no audio information has been recorded free for the next caller. If the audio signal has reset the flip-flop 234 then AND gate 272 is disabled and the counter is not decremented. The output of AND gate 272 is also connected via OR gate 280 to the motor flip-flop 114 which is reset in the event that counter 254 is decremented to turn off the motor. The motor will continue to run due to the RDY and $\overline{\text{SPL}}$ but recording will be inhibited.

Assuming that audio is detected and flip-flop 236 is reset, the TIME signal, indicating that a complete revolution has taken place, will reset the motor flip-flop 114 via gate 282, the motor again continuing to run until the splice is detected. During the splice search, the MOTOR ON signal is high and RECORD is high, thereby inhibiting the RING signal from being produced so that the device will not answer the phone until it has been fully reset.

Referring once more to FIG. 7, the MOTOR OFF signal causes the current to flow through coil 142 in a direction to cause the plungers to be depressed and the phone hung up. Gate 146 connects to transistors 144.

The system will now continue recording until all of the tracks are full at which point the RING signal can no longer be produced, and the system will not record any more information. The output of counter 254 is applied to NAND gate 284 which disables AND gate 250 when recording on the seventh track is taking place so that the RING signal cannot thereafter be produced.

Whenever the user wishes to play back the information which has been recorded by incoming calls, the auto/ready switch is released which produces the POR signal to reset flip-flop 114 and insure that the MOTOR OFF signal is produced with the same reset effects noted above. The playback switch 40 can now be depressed to apply a high input to AND gate 280. If a splice is present, then the output of gate 282 sets flip-flop 100 and the zero track is played. Flip-flop 112 is clocked high via OR gate 110 to set flip-flop 114 and produce the MOTOR ON signal which causes the loop count flip-flop 232 to remain set unless the current track is zero in which case the output of OR gate 290 is low and the output of gate 232 is clocked low by the PLAY signal. The high output of AND gate 280 also sets flip-flop 300 which is connected to flip-flop 210 to maintain that flip-flop in the PLAY mode.

The outgoing message on the zero track is now played. The TONE signal resets counter 210, decrements counter 254 and clocks flip-flop 100 low so that the other tracks can now be played. The track indicated by counter 254 is now played. When the TIME signal is produced flip-flop 114 is reset to produce the MOTOR OFF signal.

To play the next track switch 40 is again depressed. Since no splice is present, flip-flop 100 remains reset and the current track is played as described above. The track can be changed by operating switch 38 which decrements counter 254 via gate 256.

To erase, both the record and erase buttons are depressed. The erase signal clocks flip-flop 112 high setting flip-flop 114 and producing the MOTOR ON signal. Flip-flop 238 is also reset, enabling the erase function and inhibiting recording via OR gate 302. If a splice is detected, flip-flop 232 is reset via AND gate 304 and OR gate 306, so that the unit stops at the next splice. Otherwise, flip-flop 232 causes the first splice to be ignored and the unit to stop at the second splice assuring at least one full tape revolution. Gate 310 is disabled by reset gate 238 inhibiting the TIME signal. The $\overline{\text{ERASE}}$ ENABLE of flip-flop 238 is applied to transistor 320 in FIG. 4. If the $\overline{\text{TRK}\phi}$ signal from gate 290 is low, indicating track zero, only transistor 322 is turned on to erase track zero. Otherwise the remainder of the transistors are activated to erase the other tracks.

Many changes and modifications in the above embodiment can, of course, be carried out without departing from the scope of the invention. That scope, therefore, is intended to be limited only by the scope of the appended claims.

What we claim is:

1. A portable telephone answering device comprising:
   a housing adapted for removable placement over the cradle of a telephone and for removably receiving a telephone handset having a speaker and a microphone,
   a speaker adapted to be adjacent the microphone of the handset speaker when said headset is received by said housing,
   a microphone adapted to be adjacent the speaker of the handset when said handset is received by said housing,
   means extending through said housing for engaging the telephone plungers and movable to release and depress said plungers,
   means within said housing for detecting ringing of said telephone and causing said engaging means to release said plungers in response thereto,
   a tape head within said housing for reading and recording on each channel of a multi-channel tape,
   means within said housing for driving an endless loop of multi-channel tape past said head, and
   logic means within said housing for causing said driving means to drive said tape and said head to read a message recorded on one channel of the loop following detection of ringing, for causing said head to record a message on another channel thereafter, and for causing said engaging means to depress said plungers following completion of said recording, and
   counter means connected to said logic means within said housing for counting the number of other channels on which a message has been recorded so that said logic means causes said head to record on a track on which a message has not been recorded.

2. A device as in claim 1 further including means adapted for receiving a plurality of dry cell batteries within said housing for supplying electrical energy to said device.

3. A device as in claim 1 or 2 further including means for detecting the absence of an audio message on said another channel and preventing said counter means from counting said another channel then being recorded as a channel on which a message has been recorded.

4. A device as in claim 1, wherein said engaging means includes a motor, a threaded shaft driven by said motor, and an activator mounted on said shaft for movement to depress and release said plungers in accordance with the direction of rotation of said shaft.

5. A device as in claim 1, including means for detecting a reference on said tape and for causing said driving means to stop said driving upon detection of said reference and wherein said reference is a length of metal on one side of said tape and said reference detecting means includes first and second contacts which are electrically connected together by said metal.

6. A device as in claim 1, wherein said loop driving means includes a tape drive motor and a plurality of rollers, at least one roller being driven by said tape drive motor.

7. A device as in claim 1, wherein said logic means includes means for detecting a reference on said tape, means for detecting movement of said tape and producing an output indicating the tape movement from the time a given signal is produced, means for producing said given signal at the beginning of recording on said another channel, means for producing a time signal when said output indicates tape movement through a complete loop, means for causing operation of said driving means to cease following recording on said tape upon detection of said reference, and means for causing recording to cease on another channel when said time signal is produced.

8. A device as in claim 7, wherein said reference is a metallic splice in said loop, said detecting and producing means includes means for producing a sequence of pulses at a frequency related to tape speed and said time signal producing means includes a counter.

9. A device as in claim 1, wherein said tape head is a multi-channel head.

* * * * *